Jan. 16, 1968   R. McKINVEN, JR   3,363,911
SHAFT SEAL
Filed Aug. 31, 1965   2 Sheets-Sheet 1

INVENTOR
ROBERT McKINVEN JR.
BY Grent, Lockwood
Greenawalt & Dewey   ATT'YS.

Jan. 16, 1968    R. McKINVEN, JR    3,363,911
SHAFT SEAL
Filed Aug. 31, 1965    2 Sheets-Sheet 2
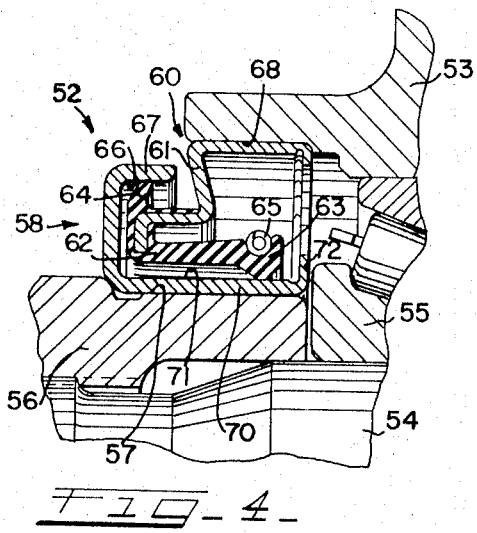
FIG-4-
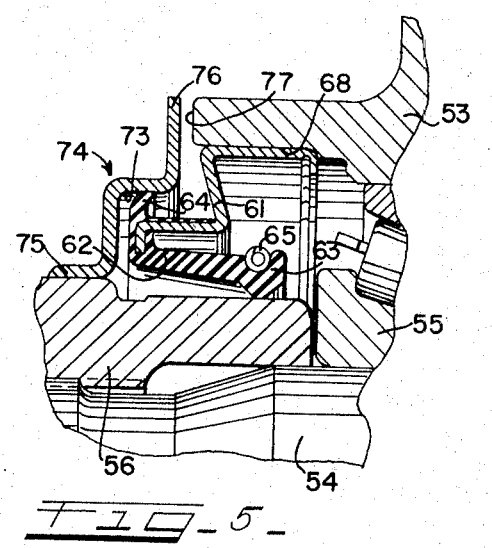
FIG-5-
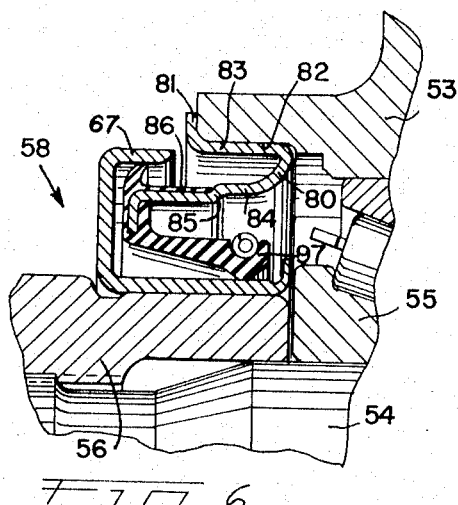
FIG-6-
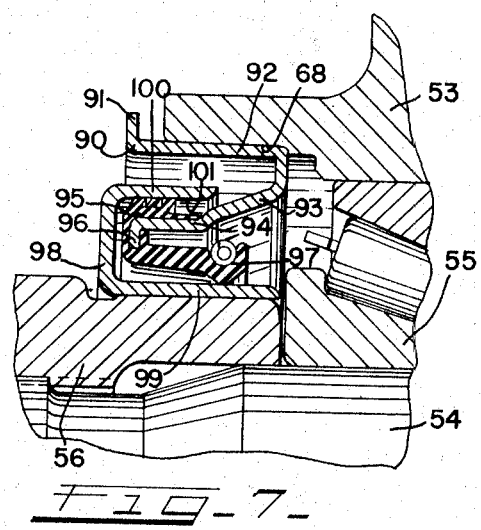
FIG-7-
INVENTOR
ROBERT McKINVEN JR.
BY Greist, Lockwood, Greenawalt, &
Dewey    ATT'YS.

United States Patent Office

3,363,911
Patented Jan. 16, 1968

---

3,363,911
SHAFT SEAL
Robert McKinven, Jr., Detroit, Mich., assignor to Chicago Rawhide Manufacturing Company, Chicago, Ill., a corporation of Illinois
Filed Aug. 31, 1965, Ser. No. 484,008
2 Claims. (Cl. 277—65)

ABSTRACT OF THE DISCLOSURE

A sealing arrangement having a flexible oil seal lip and dust excluder lip, both molded on a single stamping while flexible independently of each other. The dust excluder lip acts against a radially extending surface and flares outwardly to maximize the area between the lips for maximizing heat dissipation, preventing loss of sealing effectiveness.

---

This invention pertains to improvements in shaft seals and particularly to that type adapted for use with a pair of relatively rotatable parts to prevent the ingress of dust, dirt, and other foreign matter and the egress of fluid from within the area confined by the rotatable parts.

In seal applications, particularly in the automotive and farm equipment fields where the operating environment contains a high concentration of foreign abrasive matter such as dust, dirt and the like, it is advantageous to provide a secondary or dust excluding sealing element to protect the primary sealing element which closes off the space between relatively rotatable machine parts. In the past, exclusion elements have taken a number of forms including leather washers, felt washers, dual rubber lips which are mirror images and the like. The latter of these types has sometimes been referred to as an A-lip since it constitutes a single sealing element having two oppositely directed shaft engaging lip-like portions to form in cross section an A-like configuration. Both sealing portions contact a common rotary part such as a shaft or like rotating member.

An age-old problem in sealing and particularly in oil sealing, is the excessive heat concentration in the immediate vicinity of the sealing area. Excessive temperatures at the seal contacting areas not only results in the deterioration of the sealing element itself, but when operating in an oil environment, causes the lubricant to oxidize and break down. In the process, solid deposits may be formed which tend to lift the lip or cause an abrasive effect on the lip. Radial runout oftentimes enhances and promotes the rapid build up of oxidized oil deposits on the rotating part in the region of the sealing lip. The exclusion lip which serves to protect the sealing lip from foreign particles precludes the heat from escaping, and thus the oxidation process is expedited.

Obviously, the exclusion device oftentimes of necessity, runs in a dry environment, and thus generates additional heat. When an A-type lip is used, the exclusion member is provided with near zero interference with the rotating parts or shaft so as to minimize the heat influence. The reduced interference reduces torque and heat but oftentimes fails adequately to serve the function of an exclusionary device. Even if it functions properly, the close spacing between the sealing element and exclusionary element traps the heat with the adverse effects on the sealing element and the lubricant sealed against. Notwithstanding the simplicity of this unusual problem, the industry has lived with it since no feasible solution either from the economic or engineering standpoint has been proposed.

The present application proposes a unique solution providing a sealing element and exclusionary element which due to their unique spacing and arrangement dissipate the heat generated by the respective sealing elements acting against the sealing surfaces. An economically and functional feasible design is presented which is easily installed, of a flexible design to render it applicable to a variety of applications and which permits seal manufactures to exercise more control over the environment in which the seal operates.

A more comprehensive understanding of the unique features and additional advantages of the present invention may be had by a consideration of the objects achieved and a detailed description of the various representative embodiments.

It is an object of this invention to provide a new and improved shaft seal particularly adapted for use in environments having a heavy concentration of air entrained foreign material.

It is a further object of this invention to provide a shaft seal having an exclusion type sealing means which is spaced from the primary sealing means a maximum distance to permit heat dissipation and avoid heat entrapment between the two sealing areas.

It is a further object of this invention to provide a new and improved shaft seal arrangement wherein the mating surfaces are provided for co-operation with the sealing element consisting of a sealing lip and exclusion lip to form a rotary seal.

It is a still further object of this invention to provide a new and improved shaft sealing arrangement which due to its unique design provides a more efficient seal that is cooler running and may be manufactured at a reduced cost.

Additional objects other than those specifically enumerated will become apparent in the course of the following description of some preferred embodiments while other modifications will be clearly apparent to the man in the art who reads the description and studies the drawings.

FIG. 4 is a view similar to FIGS. 1–3 and illustrating a cartridge or self-contained type sealing arrangement wherein the exclusion lip runs on a radially spaced circumferential surface;

FIG. 5 is a view similar to FIG. 4 however, illustrating the modified form wherein the slinger and sealing element are separable;

FIG. 6 is a longitudinal cross section similar to FIG. 4 illustrating a further modified form of seal mounting member; and FIG. 7 is a sealing arrangement similar to FIGS. 4–6 illustrating a modified form of exclusionary seal and seal cooperating member.

Figure 1:
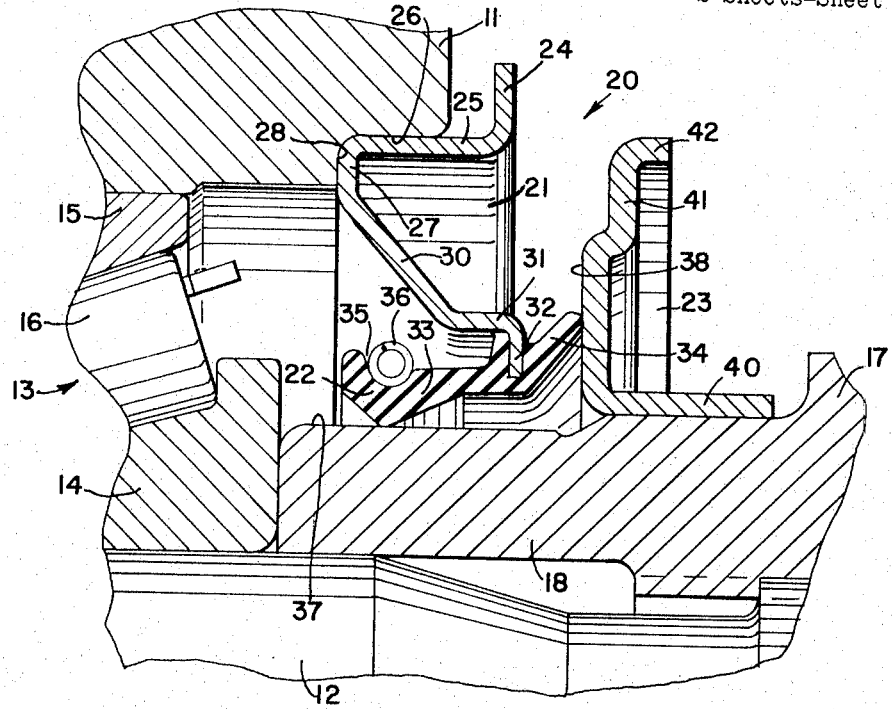
FIG. 1 is a longitudinal half section of the shaft sealing arrangement of the present invention.

Referring now to FIG. 1, a machine part such as a housing is shown fragmentarily at 11 and receives a second machine part such as the shaft 12 for rotation with support being provided by the bearing 13. The bearing 13 is of known type and includes an inner race 14 and outer race 15 held in spaced relationship for relative rotation by suitable anti-friction means shown fragmentarily at 16.

A driving member 17 is mounted for driving rotation on the shaft 12 and may be provided with a cylindrical portion or companion flange 18. A sealing arrangement, indicated generally at 20, closes off the space between the housing 11 and shaft 12 and includes a sealing element mounting member 21 and sealing element 22 having sealing portions adapted to ride on the companion flange 18 and seal against a slinger member 23.

The sealing element mounting member 21 is provided with a radially extending flange 24 which may assist in assembly or disassembly of the seal. The radially extending flange 24 is joined to a cylindrical section 25 adapted for press fitting into a bore 26 in the housing 11. A radially inwardly directed wall portion 27 may engage a shoulder 28 in the housing to limit the extent of insertion of the sealing element mounting member 21. The radially extending wall portion 27 merges into a frusto-conical portion 30 which is joined to an axial or cylindrical portion 31 terminating in a radially inwardly extending flange portion 32.

The inner cylindrical portion 31 and radial flange 32 form a mounting area for the sealing element 22 which includes a primary sealing lip 33 and a secondary sealing lip 34 integrally with each other through an annular joining section beneath the flange 32. The primary sealing lip 33 is illustrated as being a design shown and described in my copending application, Ser. No. 401,460, entitled "Seal and Method," filed Oct. 5, 1964, and includes an annular sealing lip 35 which has a groove to receive a garter spring 36 to urge the lip into sealing engagement with the outer circumferential sealing surface 37 on the companion flange 18. The circumferential sealing surface 37 may be turned and ground to provide a constant diameter smoothly finished surface to co-operate with the primary sealing lip.

The exclusion or secondary sealing lip 34 is axially and radially directed for engagement with a radially extending surface 38 on the slinger member 23. The slinger 23 includes a cylindrical mounting flange 40 which is received around the flange 18 with a press fit. The radially extending surface 38 is formed on the face of the radial flange 41 which is curled slightly at the outer margin as at 42 to rigidify the same and provide good slinging action. The turbulence generated is sufficient to deflect large particles, stones, rocks and other foreign material which would normally injure the exclusion or secondary sealing lip. The particular shape shown provides good radial flatness and sufficient rigidity with a minimum amount of metal and provides good sealing action.

Figures 2, 3:
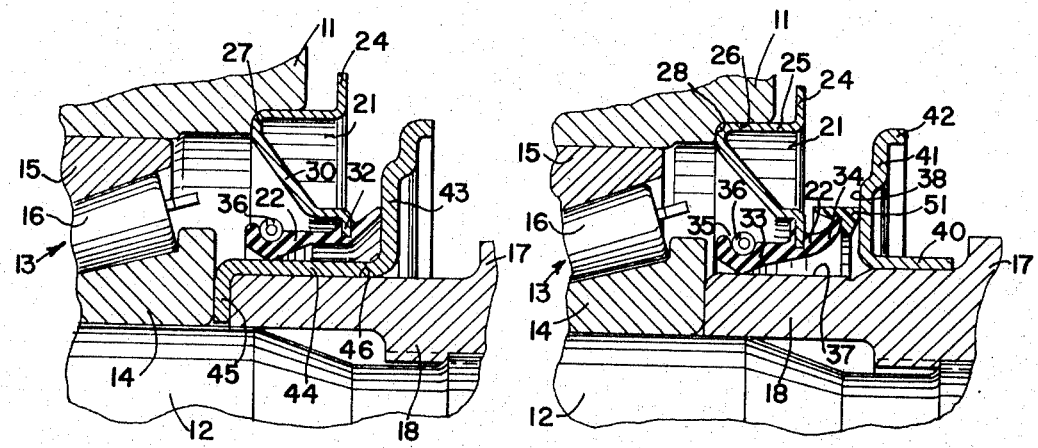
FIG. 2 is a longitudinal cross section on a reduced scale of a modified form of shaft sealing arrangement similar to FIG. 1 wherein one of the parts co-operates with the shaft supporting bearing.
FIG. 3 is a view similar to FIGS. 1 and 2 illustrating a modified form of seal.

A modified form of slinger arrangement is illustrated in FIG. 2 wherein the slinger element 43 is provided with an axially directed cylindrical flange 44 curled at its free end into a radially directed flange 45 clamped between the companion flange 18 and the inner race 14 of the bearing 13. The flange 45 serves as a sealing means between the end of the companion flange 18 and the inner race 14 of the bearing 13.

The seal element mounting means 21 and sealing element 22 are identical to that shown and described in FIG. 1 and therefore like reference characters have been used to designate like parts. In the embodiment of FIG. 2, however, the axially directed cylindrical portion 44 forms a circumferential sealing surface 46 which co-operates with the lip member 33. As this surface may be ironed, or the equivalent, during forming to provide a smooth surface, a substantial amount of machining is saved as the companion flange need not be ground. In the design of FIG. 1, the amount of grinding is materially reduced as only the primary sealing member rides on the companion flange whereas in prior art A-type lip designs, both lip elements seal on a common surface.

In the embodiment of FIG. 2, the radial flange 45 is sealingly clamped for rotation with the inner race 14 and companion flange 18 permitting the lip pressures and surface finishes to be established by the seal manufacturer and minimizing the danger of damage to the sealing surfaces in advance of installation as well. Since the exclusionary lip is sealing on a radially extending surface, radial run-out does not materially affect the sealing action. The over-all axial length of the companion flange may be reduced as only one sealing area or surface is required.

A still modified form of the invention in FIG. 1 is shown in FIG. 3 wherein like reference characters indicate like parts. The exclusionary or secondary sealing element 34 is provided with a plastic face ring 51 for co-operation with the radially extending face 38 on the slinger 41. Similarly, a face ring 51 may be used with the design shown in FIG. 2 or other designs to be described. The face ring 51 is biased axially into sealing engagement with the rotating face 38 through the resiliency of the exclusionary member 34 acting against the rearwardly facing axial and radial wall portions with the initial bias force established at assembly. In applications where the exclusionary member is running dry, the face ring 51 may be formed from a material having a low co-efficient of friction such as Delrin, Teflon or the equivalent.

Referring to FIG. 4, a still further modified form of a sealing arrangement is indicated generally at 52. The sealing arrangement 52 fluidtightly closes off the space between the machine housing 53 and shaft 54 supported for rotation within the housing by the bearing assembly 55. A companion flange 56 or similar sleeve-like member may be mounted on the shaft 54 to provide a circumferential surface 57 on which is mounted the slinger element indicated generally at 58. The sealing member 60 and slinger element 58 may be supplied as an integral unit as will become apparent.

The sealing member 60 includes a seal element mounting means 61 which supports a sealing element 62 provided with flexible lip portions at 63 and 64 with the former being biased radially inwardly by the action of a conventional garter-type spring 65.

The secondary sealing lip or exclusion portion 64 extends radially and axially from the mounting means 61 to engage an inner circumferential surface 66 on an axially extending flange 67 formed on the outer portion of the slinger 68. The seal element mounting means 61 is received in a bore 68 in the housing 53 and is provided with the usual cylindrical and radial flange adjacent the inside diameter which forms the mounting area for the seal element.

The slinger 58 is provided with an axially directed inner flange 70 which provides a continuous circumferential sealing surface portion 71 on which the primary sealing element 63 rides. The inner end of the flange is curled upwardly as at 72 and thereby holds the sealing member 60 and slinger 68 in assembled relation for installation into the bore and subsequent positioning on the companion flange 56. It is contemplated that the outside diameter of the radially directed flange 72 may be greater than the inside diameter of the seal mounting member 61 to preclude dis-assembly.

FIG. 5 represents a further modified form of seal in which the seal mounting means and sealing element is identical to that shown in FIG. 4 and therefore like reference characters have been used to designate like parts. In FIG. 5, however, the primary sealing element 63 rides on the companion flange 56 adjacent the end thereof. Exclusion element 64 co-operates with a circumferential surface 73 formed on a slinger element 74. An inner cylindrical portion 75 facilitates mounting of the slinger element 64 on the companion flange 56 and a radially directed portion 76 which when installed, is closely spaced from the end 77 of the housing 53. Since the sealing lip 64 can seal at any point along the circumferential portion 73 the spacing between the end 77 of the housing 53 and the radial flange 76 on the slinger 74 may be varied from application to application to provide relatively close spacing precluding the entry of large particles of foreign matter adjacent the sealing area. The rotary action of the slinger 74 on the companion flange 56 generates a turbulent condition which prevents the ingress of dust, dirt and other finer foregin matter into the region of the exclusion lip. The space between the seal mounting member 61 and the exclusion lip 64 provides a natural trap-like drain which will permit any liquid material to drain from the sealing area.

The embodiment shown in FIG. 6 is similar to that shown in FIG. 4 with the exception that the seal mounting members 80 in the embodiment of FIG. 6 is provided with a pry-out type flange 81 to facilitate assembly and dis-assembly from the housingbore 82. The sealing mounting member 80 is provided with the usual cylindrical mounting portion 83 which is reversely curled as at 84 to form an offset portion 85 which rigidifies the same. The radially offset portion also serves as a termination point for the mold material 86. The slinger element 58 may be of the same design as shown in FIG. 4 and therefore like reference numerals are used to designate like parts.

A still further modified form of the invention is shown in FIG. 7 closing off the space between the housing 53 and shaft 54. A conventional bearing 55 and companion flange are shown to complete a typical type pinion assembly.

The seal element mounting means 90 contains a radially directed flange 91 and cylindrical portion 92 which is press fitted into a bore 68 in the housing 53. The seal mounting means 90 further includes a radially and axially directed portion 93 which curls into a cylindrical section 94 forming a mounting area for a plurality of lips 95. A radially directed flange 96 integral with the cylindrical portion 94 rigidifies the cylindrical section 94 and supports the primary sealing lip 97.

A slinger element 98 of channel-shaped cross section is provided with an inner cylindrical portion 99 which co-operates with the primary sealing lip 97 to provide a finished sealing surface. An outer cylindrical portion 100 on the slinger 98 forms an inwardly facing circumferential sealing surface 101 for engagement by a plurality of sealing lips 95 serving to exclude dust, dirt and other foreign materials. At its inner end the axially directed outer cylindrical flange 100 is closely spaced from the axially and radially directed portion 93 of the seal mounting member 90 and is closely spaced from the inner cylindrical portion 92 to provide a tortuous path for any foreign material attempting to enter the sealing area adjacent the excluding lips 95. Coupled with the protection afforded by turbulence created by the rotation of the slinger member, the sealing elements are also protected by being nested within the housing 53 and the seal mounting member 90. The radially directed pry-out flange 91 provides a trough to permit foreign matter draining off the housing 53 to run off. If desired, the radial flange may be coextensive closely adjacent a plane containing the outer surface of the slinger member 98.

In the foregoing designs, a substantial amount of machining time is saved since the companion flange need be ground only to accommodate a single sealing lip rather than two lips as was true in the prior art. In the self-contained type of seal shown in FIGS. 4 and 6, and the embodiments providing their own wear surfaces as in FIGS. 2 and 7, finish grinding of the companion flange may be omitted. In effect, this passes the responsibility for seal performance back to the seal manufacturers where they can control the tolerances, the interference and surface finish of the co-operating surface. In effect, replacement of a seal in each one of these designs is tantamount to replacing the shaft insofar as the sealing function is concerned. Since the sealing elements are spaced radially and axially, the length of the usual companion flange may be reduced without an increase in the heat entrapment. The use of the slinger element with its substantial surface area being constantly in motion serves to provide a thermal sink to dissipate heat adjacent the sealing element resulting in a severe reduction in the operating range of heat at the sealing interface.

In the face seal embodiments shown in FIGS. 1–3, the lip may be depressed or a separate face ring provided to reduce the heat of friction to guide running. Due to the unique design, the lips may be made from different types of material for each of the sealing interfaces even though joined as an integral unit. This permits compounds which are suited for dry running to be used for the exclusionary unit and compounds which are suited to operation in oil or similar environments to be used for the primary unit. In all of the foregoing designs, the sealing lips are mounted on one mounting member which is stationary. Hence, centrifugal force does not affect the sealing lip pressure. Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. In combination, a first machine member having an annular bore, a second machine member extending through said annular bore and being rotatable about an axis relative to said first machine member, a seal engaging casing member mounted on said second machine member for rotation therewith, a shaft sealing arrangement sealing said first machine member to said second machine member, said shaft sealing arrangement including a seal mounting member having a radially extending flange portion providing axially oppositely facing radially extending seal mounting surfaces, a sealing element joined to said surfaces on said radially extending flange portion on said seal mounting member, said sealing element having a flexible lip flaring axially and radially outward relative to the rotational axis of said second machine part, said flaring lip projecting from one of said axially facing surfaces on said seal mounting member into axially biased sealing engagement with said seal engaging casing member, said sealing element also having an axially and radially inwardly directed second flexible sealing lip portion projecting from the other of said axially facing radially extending surfaces, said second flexible sealing lip having an inner diameter which is sized relative to said second machine part so as to fluid-tightly engage said second machine member along a circumferential surface of said second machine member which is axially spaced from said radially and axially extending flexible lip which engages said casing member thereby to form a heat dissipative area therebetween, and each of said sealing lips being flexible independently of the other of said lips to follow radial and axial movement of co-operating sealing surfaces.

2. The combination of claim 1 wherein said seal engaging casing member is curled at its outer periphery to form a deflector, which deflector is axially spaced from said seal mounting member, and acts on rotation of said second machine member to deflect foreign matter away from said sealing lip.

References Cited

UNITED STATES PATENTS

| | | | |
|---|---|---|---|
| 2,188,856 | 1/1940 | Chievity | 27—152 X |
| 2,280,857 | 4/1942 | Saffold | 277—166 |
| 2,657,104 | 10/1953 | Kayser | 308—187.1 |
| 2,834,616 | 5/1958 | Gebert | 308—187.1 X |
| 2,945,708 | 7/1960 | Stephens | 277—82 |
| 3,021,161 | 2/1962 | Rhoads | 277—39 X |
| 3,022,081 | 2/1962 | Kosatka | 277—39 |
| 3,101,954 | 8/1963 | Huddle | 277—39 |
| 3,144,280 | 8/1964 | Sorenson | 277—65 |

FOREIGN PATENTS

| | | |
|---|---|---|
| 588,617 | 4/1955 | Canada. |
| G. 13,658 | 5/1965 | Germany. |

MARTIN P. SCHWADRON, *Primary Examiner.*

L. L. JOHNSON, *Assistant Examiner.*